US012103012B2

(12) United States Patent
Li et al.

(10) Patent No.: US 12,103,012 B2
(45) Date of Patent: Oct. 1, 2024

(54) METHOD FOR IMPROVING GRINDING, GRADING AND CAPACITY OF ORES BY REDUCING FINENESS CONTENT RATIO IN SETTLED ORES

(71) Applicant: Yunnan Phosphating Group Co., Ltd., Kunming (CN)

(72) Inventors: Yaoji Li, Kunming (CN); Chaozhu Liu, Kunming (CN); Haibing Li, Kunming (CN); Huilin Song, Kunming (CN); Houchao Li, Kunming (CN); Wei Dong, Kunming (CN); Shuanggui Chen, Kunming (CN); Hui Zhang, Kunming (CN); Shirong Zong, Kunming (CN); Shixiang Fang, Kunming (CN); Jianyun Zhao, Kunming (CN); Chang Lu, Kunming (CN); Ning Li, Kunming (CN); Hongyan Li, Kunming (CN); Shu Fang, Kunming (CN); Jialin Zi, Kunming (CN); Guang'ai Xiong, Kunming (CN)

(73) Assignee: YUNNAN PHOSPHATING GROUP CO., LTD., Kunming (CN)

( * ) Notice: Subject to any disclaimer, the term of this patent is extended or adjusted under 35 U.S.C. 154(b) by 344 days.

(21) Appl. No.: 17/585,456

(22) Filed: Jan. 26, 2022

(65) Prior Publication Data

US 2022/0143623 A1 May 12, 2022

Related U.S. Application Data

(63) Continuation-in-part of application No. PCT/CN2020/140550, filed on Dec. 29, 2020.

(30) Foreign Application Priority Data

Apr. 8, 2020 (CN) ........................ 202010269910.5

(51) Int. Cl.
*B03B 9/00* (2006.01)
*B02C 17/18* (2006.01)
(Continued)

(52) U.S. Cl.
CPC .............. *B03B 9/00* (2013.01); *B02C 17/184* (2013.01); *B02C 23/08* (2013.01); *B02C 23/20* (2013.01); *B03B 5/34* (2013.01)

(58) Field of Classification Search
CPC B03B 5/34; B03B 9/00; B02C 17/184; B02C 23/08
See application file for complete search history.

(56) References Cited

U.S. PATENT DOCUMENTS 9,079,184 B2 * 7/2015 Claycamp ............... B02C 23/08
2019/0111440 A1 * 4/2019 Theodoulou .............. B03B 9/06

FOREIGN PATENT DOCUMENTS

DE 102010033628 A1 * 1/2012 ......... B02C 17/1845

* cited by examiner

*Primary Examiner* — Faye Francis
(74) *Attorney, Agent, or Firm* — MATTHIAS SCHOLL P.C.; Matthias Scholl

(57) ABSTRACT

A method of improving grinding, grading and capacity of ores by reducing a fineness content ratio $\theta_0$ in settled ores includes providing a two-stage ore grinding and grading system including a first fully closed circuit including a grinder and a hydrocyclone, or a two-stage ore grinding and grading system including a first-stage open circuit, and controlling parameters for ore grinding and grading as follows: controlling a dc $\overline{an}$ value of a point B on a separation cone of a second-stage Φ500 mm hydrocyclone; controlling a fineness content ratio $\theta_0$ in settled ores; controlling a second-stage ore grinding and grading load $Q_2$; and acquiring a first-stage grinding, grading and capacity Q of ores.

8 Claims, 19 Drawing Sheets

(51) Int. Cl.

| | |
|---|---|
| ***B02C 23/08*** | (2006.01) |
| ***B02C 23/20*** | (2006.01) |
| ***B03B 5/34*** | (2006.01) |

| ID | Yield (%) | Concentration expressed in percentage by weight (%) | Liquid solid ratio (times) | Processing quantity (t/h) | Volume flow ($m^3/h$) | Specific granularity–200 mesh content (%) | -200 mesh ore quantity (t/h) |
|---|---|---|---|---|---|---|---|
| P101 | 100.00 | 90.00 | 0.11 | 250.00 | 113.98 | 8.00 | 20.00 |
| P102 | 225.00 | 75.00 | 0.33 | 562.00 | 381.60 | 38.33 | 215.43 |
| P103 | 325.00 | 78.02 | 0.27 | 812.00 | 485.58 | 40.00 | 324.80 |
| P104 | 325.00 | 59.10 | 0.69 | 812.00 | 842.40 | 45.00 | 365.40 |
| P105 | 100.00 | 40.00 | 1.50 | 250.00 | 460.80 | 60.00 | 150.00 |

FIG. 1B

*Symbol description:*
*S Sand return ratio (times)*
*E Grading efficiency (%)*

| ID | Yield (%) | Concentration expressed in percentage by weight (%) | Liquid solid ratio (times) | Processing quantity (t/h) | Volume flow ($m^3/h$) | Specific granularity–200 mesh content (%) | -200 mesh ore quantity (t/h) |
|---|---|---|---|---|---|---|---|
| P201 | 100.00 | 94.00 | 0.06 | 179.30 | 72.64 | 11.01 | 19.74 |
| P202 | 158.36 | 72.12 | 0.39 | 283.94 | 206.67 | 17.63 | 50.06 |
| P203 | 258.36 | 69.22 | 0.44 | 463.24 | 279.31 | 15.07 | 69.80 |
| P204 | 258.36 | 69.22 | 0.44 | 463.24 | 364.09 | 34.08 | 157.87 |
| P205 | 258.36 | 59.20 | 0.69 | 463.24 | 477.42 | 34.08 | 157.87 |
| P206 | 100.00 | 46.11 | 1.17 | 179.30 | 270.75 | 60.13 | 107.81 |
| P207 | 232.53 | 68.13 | 0.47 | 416.93 | 337.33 | 44.69 | 186.31 |
| P208 | 332.53 | 46.34 | 1.16 | 596.23 | 893.89 | 49.33 | 294.12 |
| P209 | 232.53 | 70.18 | 0.42 | 416.93 | 319.45 | 33.56 | 139.92 |
| P210 | 100.00 | 25.89 | 2.86 | 179.30 | 574.44 | 86.00 | 154.20 |

FIG. 2B

| ID | Yield (%) | Concentration expressed in percentage by weight (%) | Liquid solid ratio (times) | Processing quantity (t/h) | Volume flow ($m^3/h$) | Specific granularity–200 mesh content (%) | -200 mesh ore quantity (t/h) |
|---|---|---|---|---|---|---|---|
| P301 | 100.00 | 96.00 | 0.04 | 185.39 | 71.00 | 7.00 | 12.98 |
| P302 | 172.77 | 73.73 | 0.36 | 320.30 | 223.44 | 14.38 | 46.06 |
| P303 | 272.77 | 74.57 | 0.34 | 505.69 | 294.44 | 11.67 | 59.04 |
| P304 | 272.77 | 74.57 | 0.34 | 505.69 | 345.04 | 29.73 | 150.34 |
| P305 | 272.77 | 60.38 | 0.66 | 505.69 | 504.43 | 29.73 | 150.34 |
| P306 | 100.00 | 45.99 | 1.17 | 185.39 | 280.99 | 56.25 | 104.28 |
| P307 | 193.80 | 71.69 | 0.39 | 359.29 | 264.50 | 41.30 | 148.39 |
| P308 | 293.80 | 43.88 | 1.28 | 544.68 | 882.47 | 46.39 | 252.68 |
| P309 | 193.80 | 71.69 | 0.39 | 359.29 | 264.50 | 24.29 | 87.27 |
| P310 | 100.00 | 25.05 | 2.99 | 185.39 | 617.96 | 89.22 | 165.40 |

FIG. 3B

| ID | Yield (%) | Concentration expressed in percentage by weight (%) | Liquid solid ratio (times) | Processing quantity (t/h) | Volume flow ($m^3/h$) | Specific granularity– 200 mesh content (%) | -200 mesh ore quantity (t/h) |
|---|---|---|---|---|---|---|---|
| P401 | 100.00 | 95.08 | 0.05 | 203.67 | 80.05 | 4.65 | 9.47 |
| P402 | 156.33 | 78.84 | 0.27 | 318.41 | 194.13 | 9.06 | 28.85 |
| P403 | 256.33 | 84.47 | 0.18 | 522.08 | 274.18 | 7.34 | 38.32 |
| P404 | 256.33 | 78.38 | 0.28 | 522.08 | 322.19 | 23.19 | 121.07 |
| P405 | 256.33 | 61.62 | 0.62 | 522.08 | 503.31 | 23.19 | 121.07 |
| P406 | 100.00 | 45.94 | 1.18 | 203.67 | 309.18 | 45.28 | 92.22 |
| P407 | 168.19 | 71.62 | 0.40 | 342.55 | 252.65 | 45.15 | 154.67 |
| P408 | 268.19 | 46.10 | 1.17 | 546.22 | 825.19 | 45.20 | 246.89 |
| P409 | 168.19 | 71.62 | 0.40 | 342.55 | 252.65 | 19.36 | 66.32 |
| P410 | 100.00 | 28.82 | 2.47 | 203.67 | 572.54 | 88.66 | 180.57 |

FIG. 4B

| ID | Yield (%) | Concentration expressed in percentage by weight (%) | Liquid solid ratio (times) | Processing quantity (t/h) | Volume flow ($m^3$/h) | Specific granularity–200 mesh content (%) | -200 mesh ore quantity (t/h) |
|---|---|---|---|---|---|---|---|
| P501 | 100.00 | 94.50 | 0.06 | 230.00 | 91.88 | 4.65 | 10.70 |
| P502 | 156.03 | 78.90 | 0.27 | 358.87 | 218.45 | 8.50 | 30.50 |
| P503 | 256.03 | 84.34 | 0.19 | 588.87 | 310.33 | 7.00 | 41.20 |
| P504 | 256.03 | 79.00 | 0.27 | 588.87 | 357.51 | 22.60 | 133.08 |
| P505 | 256.03 | 61.53 | 0.63 | 588.87 | 569.13 | 22.60 | 133.08 |
| P506 | 100.00 | 45.80 | 1.18 | 230.00 | 350.68 | 44.60 | 102.58 |
| P507 | 160.97 | 72.00 | 0.39 | 370.24 | 270.35 | 44.23 | 163.75 |
| P508 | 260.97 | 45.82 | 1.18 | 600.24 | 914.69 | 44.37 | 266.33 |
| P509 | 160.97 | 72.00 | 0.39 | 370.24 | 270.35 | 17.08 | 63.24 |
| P510 | 100.00 | 28.90 | 2.46 | 230.00 | 644.35 | 88.30 | 203.09 |

FIG. 5B

| ID | Yield (%) | Concentration expressed in percentage by weight (%) | Liquid solid ratio (times) | Processing quantity (t/h) | Volume flow ($m^3$/h) | Specific granularity–200 mesh content (%) | -200 mesh ore quantity (t/h) |
|---|---|---|---|---|---|---|---|
| P601 | 100.00 | 96.50 | 0.04 | 186.00 | 64.87 | 3.50 | 6.51 |
| P602 | 182.77 | 82.20 | 0.22 | 339.95 | 179.85 | 12.50 | 42.49 |
| P603 | 282.77 | 86.75 | 0.15 | 525.95 | 244.72 | 9.32 | 49.00 |
| P604 | 282.77 | 68.10 | 0.47 | 525.95 | 410.73 | 27.53 | 144.79 |
| P605 | 282.78 | 68.10 | 0.47 | 525.95 | 410.70 | 27.53 | 144.79 |
| P606 | 100.00 | 51.85 | 1.24 | 186.00 | 230.85 | 55.00 | 102.30 |
| P607 | 220.95 | 66.24 | 0.51 | 410.96 | 337.88 | 36.55 | 150.21 |
| P608 | 320.95 | 55.00 | 0.82 | 596.96 | 675.00 | 42.30 | 252.51 |
| P609 | 220.95 | 66.24 | 0.51 | 410.96 | 337.88 | 27.50 | 113.01 |
| P610 | 100.00 | 40.00 | 1.50 | 186.00 | 337.13 | 75.00 | 139.50 |

FIG. 6B

| ID | Yield (%) | Concentration expressed in percentage by weight (%) | Liquid solid ratio (times) | Processing quantity (t/h) | Volume flow ($m^3$/h) | Specific granularity–200 mesh content (%) | -200 mesh ore quantity (t/h) |
|---|---|---|---|---|---|---|---|
| P701 | 100.00 | 96.50 | 0.04 | 210.00 | 73.24 | 3.50 | 7.35 |
| P702 | 182.67 | 83.50 | 0.20 | 383.60 | 195.68 | 11.60 | 44.50 |
| P703 | 282.67 | 87.68 | 0.14 | 593.60 | 268.92 | 8.73 | 51.85 |
| P704 | 282.67 | 68.40 | 0.46 | 593.60 | 459.74 | 26.60 | 157.90 |
| P705 | 282.67 | 68.40 | 0.46 | 593.60 | 459.70 | 26.60 | 157.90 |
| P706 | 100.00 | 51.42 | 1.26 | 210.00 | 264.03 | 54.00 | 113.40 |
| P707 | 141.41 | 82.30 | 0.22 | 296.95 | 156.66 | 34.03 | 101.04 |
| P708 | 241.41 | 58.07 | 0.72 | 506.95 | 524.48 | 42.30 | 214.44 |
| P709 | 141.41 | 82.30 | 0.22 | 296.95 | 156.66 | 16.70 | 49.59 |
| P710 | 100.00 | 41.00 | 1.44 | 210.00 | 367.82 | 78.50 | 164.85 |

FIG. 7B

| ID | Yield (%) | Concentration expressed in percentage by weight | | Liquid solid ratio (times) | Processing quantity (t/h) | Volume flow ($m^3/h$) | Specific granularity-230 mesh content (%) | -230 mesh ore quantity (t/h) |
|---|---|---|---|---|---|---|---|---|
| | | (%) | (g/L) | | | | | |
| P801 | 100.00 | 88.59 | 2282.28 | 0.13 | 85.93 | 40.70 | 11.34 | 9.74 |
| P802 | 100.00 | 65.91 | 1389.61 | 0.52 | 85.93 | 61.84 | 30.98 | 26.62 |
| P803 | 706.34 | 56.94 | 1120.04 | 0.76 | 606.97 | 541.92 | 20.74 | 125.89 |
| P804 | 806.34 | 46.61 | 851.18 | 1.15 | 692.90 | 806.09 | 22.01 | 152.51 |
| P805 | 100.00 | 20.98 | 325.29 | 3.77 | 85.93 | 264.17 | 73.29 | 62.98 |
| P806 | 706.34 | 56.94 | 1120.04 | 0.76 | 606.97 | 541.92 | 14.75 | 89.53 |

FIG. 8B

| ID | Yield (%) | Concentration expressed in percentage by weight | | Liquid solid ratio (times) | Processing quantity (t/h) | Volume flow ($m^3/h$) | Specific granularity-230 mesh content (%) | -230 mesh ore quantity (t/h) |
|---|---|---|---|---|---|---|---|---|
| | | (%) | (g/L) | | | | | |
| P901 | 100.00 | 88.59 | 2282.28 | 0.13 | 115.00 | 54.47 | 11.34 | 13.04 |
| P902 | 100.00 | 65.91 | 1389.61 | 0.52 | 115.00 | 82.76 | 26.50 | 30.48 |
| P903 | 236.24 | 62.44 | 1264.85 | 0.62 | 271.67 | 260.81 | 29.38 | 79.82 |
| P904 | 336.24 | 42.00 | 743.10 | 1.38 | 386.67 | 520.35 | 28.50 | 110.20 |
| P905 | 100.00 | 21.59 | 335.96 | 2.62 | 115.00 | 342.30 | 80.00 | 92.00 |
| P906 | 236.24 | 70.00 | 1525.82 | 0.43 | 271.67 | 178.05 | 6.70 | 18.20 |

FIG. 9B

METHOD FOR IMPROVING GRINDING, GRADING AND CAPACITY OF ORES BY REDUCING FINENESS CONTENT RATIO IN SETTLED ORES

CROSS-REFERENCE TO RELAYED APPLICATIONS

This application is a continuation-in-part of International Patent Application No. PCT/CN2020/140550 with an international filing date of Dec. 29, 2020, designating the United States, now pending, and further claims foreign priority benefits to Chinese Patent Application No. 202010269910.5 filed Apr. 8, 2020. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to the technical field of an ore grinding and grading process of a hydrocyclone.

I. Descriptions of Background Art

1. Background Art I

The hydrocyclone is independently used for the grading operation in an ore grinding circuit in a dressing plant.

A calculating example of the hydrocyclone is as follows (refer to *Beneficiation Design Manual* $P_{164}$):

Grading is performed by a hydrocyclone in a ball-milling circuit.

The feeding capacity is 250 t/h.

The overflow concentration is 40 wt. %.

The granularity of the overflow product smaller than 74 μm (−200 meshes, similarly hereinafter) is set to accounting for 60%.

The ore density is 2.9 $t/m^3$.

The working gauge pressure at the inlet of the hydrocyclone is 55 kPa.

The circulating load of the ore grinding circuit is 225%.

Specifications of the hydrocyclone are decided according to the abovementioned conditions, and the number of the hydrocyclone needed is calculated.

a) Material Balance Calculation in the Ore Grinding Circuit

The material balance calculation in the ore grinding circuit is listed in Table 1.

TABLE 1

Material balance calculation result

| Item | Unit | Overflow | Settled ores | Ore feeding |
|---|---|---|---|---|
| Solid quantity | t/h | 250 | 562 | 812 |
| Water yield | $m^3/h$ | 375 | 187 | 562 |
| Ore pulp quantity | t/h | 625 | 749 | 1374 |
| Concentration | % | 40 | 75 (Volume concentration is about 50) | 59.1 |
| Ore pulp concentration | $t/m^3$ | 1.355 | 1.966 | 1.632 |
| Ore pulp volume | L/s | 128 | 106 | 234 |

FIGS. 1A-1B are ore pulp flow diagrams of the ore grinding and grading process based on Table 1.

b) $d_{50(c)}$ Calculation

The granularity of the overflow product smaller than 74 μm is set to accounting for 60%, as shown in Table 2:

$$d_{50(c)} = 2.08/d_T = 2.08\times 74 = 154\ \mu m$$

TABLE 2

Relation between the granularity of the overflow of the hydrocyclone and $d_{50}$ (Beneficiation Design Manual $P_{163}$)

| Percentage of some specific grade ($d_T$) in the overflow, % | 98.8 | 95.0 | 90.0 | 80.0 | 70.0 | 60.0 | 50.0 |
|---|---|---|---|---|---|---|---|
| $d_{50(c)}/d_T$ | 0.54 | 0.73 | 0.91 | 1.25 | 1.67 | 2.08 | 2.78 |

c) Calculation of Diameter D of the Hydrocyclone

It is known from Table 2 that the weight concentration of the ore feeding of the hydrocyclone is 59.1%, and the volume concentration thereof is 33.2%. According to the following formula (*Beneficiation Design Manual* $P_{163}$):

$$d_{50(c)} = \frac{11.93D^{0.66}}{P^{0.28}(\rho-1)^{0.5}} \exp(-0.301+0.0945C_V-0.00356C_V^2+0.0000684C_V^3);$$

there is, $$154 = \frac{11.93D^{0.66}}{55^{0.28}(2.9-1)^{0.5}} \exp(-0.301+0.0945\times 33.2-0.00356\times 33.2^2 + 0.0000684\times 33.2^3)$$

Thus, the specification diameter D of the hydrocyclone is 50 cm, the diameter dc of the overflow pipe is 17 cm, an equivalent diameter dn of the ore feeding port is 13 cm, and a taper α is 20°.

d) Calculation of the Processing Capacity V of the Hydrocyclone:

$$V = 3\cdot K_D\cdot K_\alpha\cdot dn\cdot dc\cdot\sqrt{P_0};$$

$$\left(\text{diameter coefficient } K_D = 0.8+\frac{1.2}{1+0.1D}\right);$$

$$\left(\text{conial angle coefficient } K_\alpha = 0.79+\frac{0.044}{0.0397+\tan\frac{\alpha}{2}}\right);$$

$$V = 3\times 1\times\left(0.8+\frac{1.2}{1+0.1\times 50}\right)\times 13\times 17\times\sqrt{0.055} = 155.5\ m^3/h.$$

2. Background Art II

FIGS. 2A-2B are conventional ore grinding and grading method for Kunyang mine series in a floating plant, Jinning beneficiation branch company, Yunnan Phosphate Group Co., Ltd. Different from the background art I, the floating plant adopts a two-stage ore grinding and grading process with a fully closed first stage, and is complex in structure. The loads of the grinders in the first and second stages are difficult to balance and are unstable, and the operation management is particularly strict.

(1) The feeding capacity is 179.30 t/h.

(2) The overflow concentration is 25.89%.

(3) The granularity of the overflow product smaller than 74 μm is set to accounting for 86.00%.

(4) The ore density is 2.93 $t/m^3$.

(5) The gauge pressure at the inlet of the hydrocyclone is 0.16 MPa (the diameter of the second stage is Φ500).

(6) The diameter D of the second-stage hydrocyclone is 500 mm, the diameter dc of the overflow pipe is 160 mm, the equivalent diameter dn of the ore feeding port is 130 mm, and a taper α is 20°.

(7) The volume processing capacity V of the second stage hydrocyclone:

$$V = 3 \cdot K_D \cdot K_\alpha \cdot dn \cdot dc \cdot \sqrt{P};$$

$$V = 3 \times 1 \times 0.995 \times 13 \times 16 \times \sqrt{0.16} = 248.45\ \text{m}^3/\text{h}.$$

II. Characteristics of Background Arts

1. Background Art I (1) The ore grinding and grading is a closed-circuit process flow, which was widely used in rich ores decades' years ago.

(2) The diameter D of the hydrocyclone is determined by a $d_{50(c)}$/dT value calculation method according to the fineness value of the overflow. The $d_{50(c)}$/dT value is in a range of 0.91-2.08 and the Φ500 mm hydrocyclone is adopted directly. In recent twenty years, the method has been no longer used in production. But the fineness index of the overflow is taken as a design reference, and the dn and dc values are also determined by using a comparison method.

(3) The single hydrocyclone has large processing capacity, and the processing capacity reaches 155.5 $m^3$/h when the ore feeding pressure reaches 0.055 MPa. If the ore feeding pressure is 0.11 MPa, the processing capacity may reach 219.9 $m^3$/h.

2. Background Art II (1) The ore grinding and grading is a two-stage process with a first fully closed circuit, which is particularly suitable for oxidized ores. The method is complex, and the loads in the first stage and the second stage may be balanced under strict control.

(2) The ore feeding pressure is adjusted according to the fineness of the overflow, and the Φ500 mm hydrocyclone is used. The dn and dc values are determined by using a comparison method, which are basically the same as that in the background art I.

(3) The single hydrocyclone has large processing capacity, if the ore feeding pressure is 0.20 MPa, the processing capacity may reach 396.00 $m^3$/h.

III. Disadvantages of the Background Arts

1. Fineness Content Ratio $\theta_0$ in Settled Ores

The fineness content ratio $\theta_0$ is defined as follows: a ratio of the ore quantity of $Q_{-200\ mesh}$ (−74 μm particle size, similarly hereinafter) in the settled ores to the ore quantity of $Q_{-200\ mesh}$ (−74 μm particle size, similarly hereinafter) in the feeding ores, is called a fineness content ratio $\theta_0$ in the settled ores. The fineness content ratio $\theta_0$ may be expressed by a decimal point and a percentage.

2. Analysis of Background Art I

It is known from FIGS. 1A-1B that the $Q_{-200\ mesh}$ ore quantity in the settled product (settled ore) at #2 point is 215.43 t/h, while the $Q_{-200\ mesh}$ ore quantity in the feeding ores at #4 point is 365.40 t/h, and thus, $\theta_0$=215.43/365.40=0.5896, or 58.96%. Only 41.04% (a small part) of −200 mesh ores of the feeding ores enter the overflow product for further processing. A lot of −200 mesh ores (accounting for 58.96%) mix with the settled cores and return to a grinder for further grinding, which not only occupies the grinder space and blocks the production channel, but also causes the over-grinding and over-crushing of the ores, thereby leading to adverse influence on the downstream flotation operation.

3. Analysis of Background Art II

It is known from FIGS. 2A-2B that the $Q_{-200\ mesh}$ ore quantity in the settled product at #9 point is 139.92 t/h, while the $Q_{-200\ mesh}$ ore quantity in the feeding ores at #8 point is 294.12 t/h, and thus $\theta_0$=139.92/294.12=0.4757, or 47.57%. Only 52.43% (a small part) of −200 mesh ores in the feeding ores enter the overflow product for further processing. A lot of −200 mesh ores (accounting for 47.57%) mix with the settled cores and return to a grinder for further grinding, which not only occupies the grinder space and blocks the production channel, but also causes the over-grinding and over-crushing of the ores, thereby leading to adverse influence on the downstream flotation operation.

SUMMARY

Aiming to overcome the problem that the ore grinding and grading channel in conventional ore classification devices tends to be blocked and the fineness content ratio $\theta_0$ in the settled ores is comparatively high, the disclosure provides a method of improving the grinding, grading and capacity of ores by way of reducing the fineness content ratio $\theta_0$ in the settled ores.

The disclosure provides a method of improving the grinding, grading and capacity of ores by reducing the fineness content ratio $\theta_0$ in the settled ores, the method comprising providing a two-stage ore grinding and grading system comprising a first fully closed circuit comprising a grinder and a hydrocyclone, or a two-stage ore grinding and grading system comprising a first-stage open circuit, and controlling parameters for ore grinding and grading as follows: controlling a separation centrifugal force strength $dc\overline{an}$ value of a point B on a separation cone of a second-stage Φ500 mm hydrocyclone; controlling a fineness content ratio $\theta_0$ in the settled ores; controlling a second-stage ore grinding and grading load ($Q_2$); and acquiring a first-stage grinding, grading and capacity Q of ores.

In the grading section $h_1$ of the settled ores and the overflow product of the hydrocyclone, a grading centrifugal force strength $dn\ \overline{an}$ at a point A is 12-13 gravitational accelerations; in the separation section $h_2$ of the settled ores and the overflow product of the hydrocyclone, the separation centrifugal force strength $dc\overline{an}$ at a point B is 72.6-84.45 gravitational accelerations; and the separation centrifugal force strength $dc\overline{an}$ at the point B is 6.05-6.50 times of the grading centrifugal force strength $dn\ \overline{an}$ at the point A.

The fineness content ratio $\theta_0$ in the settled ores in the hydrocyclone is 23.74-16.52%.

Reducing the fineness content ratio $\theta_0$ in the settled ores in the hydrocyclone decreases tons of −200 mesh grade ores in the settled product, and one ton of new capacity is increased, with a convertible ratio as follows:

4.1. the convertible ratio of medium-low grade collophanite is 1.512:1;

4.2. the convertible ratio of copper oxide ores is 2.64:1;

4.3. the convertible ratio of bauxite is 2.45:1.

The centrifugal force strength $dc\overline{an}$ at the point B of the separation cone of the hydrocyclone is calculated as follows: $dc\overline{an}$ at the point B=$5875.69K_D^2 \times K_\alpha^2 \times P \times dn^2/dc^3$;

where $K_D$ is a diameter correction coefficient of the hydrocyclone;

$K_\alpha$ is a core angle correction coefficient of the hydrocyclone;

dn is an equivalent diameter of an ore feeding pipe, cm;

dc is a diameter of an overflow pipe, cm;

P is an ore feeding pressure, MPa;

5875.69 is a constant value.

The concentration and the fineness of the overflow product in the hydrocyclone are increased respectively in term of different ores:

1) 3.01% and 2.3% for medium-low grade collophanite;

2) 1% and 3.5% for copper oxide ores; and 3) 0.61% and 6.71% for bauxite.

The cylindrical diameter D of the hydrocyclone is Φ466-Φ500 mm.

The method of the disclosure improves the actual grinding, grading and capacity of ores of the rearmost end of the production line system indirectly by way of reducing (controlling) the numerical value of the fineness content ratio $\theta_0$ in the settled ores at the front end of the production line system. Under the condition that devices in the original production line system are invariable, each grinding, grading and capacity of ores is improved. The conventional theory and actual operation of controlling the β value of the overflow fineness (the smaller the better) is changed, and the actual control point is changed: control of $dc\overline{an}$ value at the point B on the separation cone of the second-stage 1500 mm hydrocyclone; control of the fineness content ratio $\theta_0$ in the settled ores; control of the second-stage ore grinding and grading load ($Q_2$); and finally, acquisition of first-stage grinding, grading and capacity Q of ores.

The working mechanism (shown in FIGS. 5A-5B and FIG. 10) is as follows: the pressured ore pulp rotates around the axis of the hydrocyclone once entering the hydrocyclone, and mineral granule groups, under the joint action of various forces, are distributed in the container according to granularities, densities, shapes and concentrations thereof. At the time, the density of the ore pulp and the granularity and density of the ores increase from the axis of the hydrocyclone to the wall direction and from the point B of the overflow pipe to the ore release nozzle 8, just like a fixed density surface and a fixed granular surface form in the hydrocyclone. These surfaces are conical, and the conical angles thereof are greater than that of the hydrocyclone. Further, the density and granularity of the ore pulp change according to different heights, and a dense area exits in the lower cone portion and a diluted area exists in the upper cone portion. On a small section of the cone section above the ore release nozzle, the outer vortex is divided into two ore pulp flows, one of which is an inner vortex sprayed out from the ore release nozzle, and the other swirled in and discharged to the overflow pipe. The former is great in granularity, with thicker concentration; and the latter is minute, fine and finer in granularity, with smaller concentration.

The generation and separation of the settled ores and overflow products of the hydrocyclone is summarized as follows: the grading energy of the settled ores and the overflow products of the hydrocyclone is originated from the centrifugal force field strength $dn\overline{an}$ at the point A of the grading stage $h_1$ and is also from a dnu value of a tangential speed at the point A. Meanwhile, on the same radius, the upper static pressure is greater than the lower static pressure, so that the mineral grain groups move from the point A to the ore release nozzle 8 with a liquid phase as a carrier. An Archimedes helix track is engraved on the wall to finish the grading process of the settled ores and overflow products.

Data in Table 3 shows that the $dn\overline{an}$ values in the conventional background art and the $dn\overline{an}$ values at the point A of the disclosure are between 12-13 gravitational accelerations and are substantially identical. It shows that the energy for the Φ500 mm hydrocyclone to grade the settled ores of −200 mesh grade ores and the overflow products is enough.

TABLE 3

Centrifugal force field of generation and separation of settled ores and overflow of hydrocyclone

| Name | Symbol | Unit | Hydrocyclone specifications: Φ500 mm Manual | Φ500 mm Conventional hydrocyclone (elements) | Φ400 mm First generation of R & D Center | Φ500 mm Second generation of R & D Center | Φ500 mm Third generation of R & D Center |
|---|---|---|---|---|---|---|---|
| Centrifugal force field of generation of settled ores and overflow at point A | | | | | | | |
| Ore feeding pressure | P | MPa | 0.055 | 0.16 | 0.20 | 0.20 | 0.20 |
| Volume flow | dnV | $m^3/h$ | 155.5 | 248.45 | 241.62 | 153.58 | 133.83 |
| Tangential speed | dnu | m/s | 3.25 | 5.20 | 7.06 | 5.64 | 5.35 |
| Rotation speed | dnn | rpm | 1186.91 | 1896.54 | 3220.13 | 2058.33 | 1952.72 |
| Centrifugal force strength | $dn\overline{an}$ | g | 4.32 | 11.02 | 25.42 | 12.98 | 11.69 |
| Centrifugal force field of separation of settled ores and overflow at point B | | | | | | | |
| Separation speed | dcu | m/s | 3.04 | 5.49 | 6.08 | 6.04 | 6.26 |

TABLE 3-continued

Centrifugal force field of generation and separation of settled ores and overflow of hydrocyclone

| Name | Symbol | Unit | Hydrocyclone specifications | | | | |
|---|---|---|---|---|---|---|---|
| | | | Φ500 mm Manual | Φ500 mm Conventional hydrocyclone (elements) | Φ400 mm First generation of R & D Center | Φ500 mm Second generation of R & D Center | Φ500 mm Third generation of R & D Center |
| Rotation speed | dcn | rpm | 3266.24 | 6260.05 | 7388.65 | 9172.61 | 10377.01 |
| Centrifugal force strength | $dc\overline{an}$ | Gravitational acceleration | 11.12 | 38.43 | 50.19 | 61.88 | 72.60 |
| Separation granularity | $d_{97}$ | μm | 94.94 | 68.89 | 53.84 | 57.07 | 54.48 |
| Primary parameters | | | | | | | |
| Effective volume | $V_1$ | $m^3$ | 0.239 | 0.239 | 0.153 | 0.239 | 0.208 |
| Working time | t | s | 5.53 | 3.46 | 2.28 | 5.60 | 5.60 |
| Equivalent diameter of slurry feeding pipe | dnΦ | Φmm | 130 | 130 | 110 | 98 | 94 |
| Overflow pipe diameter | dcΦ | Φmm | 170 | 160 | 150 | 120 | 110 |
| Diameter of ore release nozzle | $d_H$Φ | Φmm | 89 | 72 | 72 | 70 | 70 |
| Processing capacity | Q | t/h | 250 | 179.30 | 185.39 | 203.67 | 230.00 |
| Fineness content ratio | $\theta_0$ | % | 58.96 | 47.57 | 34.54 | 26.86 | 23.74 |
| Overflow rate of grinding circuit | | % | 30.77 | 30.07 | 34.04 | 37.29 | 38.32 |

In practice, two completely different grinding cracks are left on the cone section with the cone length H=1428 mm on the Φ500 mm hydrocyclone with the conical degree of α=20°, where the upper cone section h1 is about 1021-1064 mm long, which accounts for 72-75% of the total cone length; the grinding crack of the Archimedes helix is clear and distinct, small in energy and shallow in grinding crack. However, the lower cone section h2 is about 354-397 mm long, which accounts for 25-28% of the total cone length, and the Archimedes helix disappears and is replaced by a concave surface polished by a grinding wheel. It is because the axial speed on the separation cone of the lower cone section $h_2$ changes greatly. The upward axial speed decreases suddenly and the downward axial speed increases suddenly, so that the rotating direction of most liquid phase in the ore pulp comprising a lot of −200 mesh grade ores mineral grain groups is unchanged, and penetrate through the container based on the air column near the center axis of the cyclone along the direction of the overflow orifice, which is called the overflow product. The outer vortex comprising a lot of +200 mesh mineral grain groups is sprayed out from the ore release nozzle, which is called the settled product.

The centrifugal force strength on the separation cone section of the disclosure is 1.9-7.6 times of that in the conventional background art (Table 3). The $dc\overline{an}$ value of the centrifugal force strength on the separation cone section of the disclosure is 6.21 times of the $dn\overline{an}$ value of the centrifugal force strength on the separation cone section of the disclosure (Table 3). The two conclusions are drawn from more than 300 thousand data based on 44 industrial units, which supports the working mechanism of the disclosure, and brings the following four technical breakthroughs:

1. Revolution of Design Research of the Cyclone

The conventional background art puts emphasis on the overflow concentration C and the fineness β value. The disclosure studies the fineness content ratio $\theta_0$ in the settled ores, the index of the fineness content ratio $\theta_0$ in the settled ores is controlled, and the results verify that the concentration and the fineness of the overflow product is increased, thereby producing an unexpected technical effect.

2. The Disclosure Discloses the Separating Centrifugal Force Strength $Dc\overline{an}$ Value at the Point B at the First Time, where +/−200 Grade Ores are Separated Fully and Thoroughly:

- 2.1. For the medium-low grade collophanite and the copper oxide ores, the $dc\overline{an}$ at the point B is 72.6 gravitational accelerations.
- 2.2. For alkaline ore pulp of the bauxite, the $dc\overline{an}$ at the the point B is 84.45 gravitational accelerations.

3. Revolution of Design Research of the Hydrocyclone

Conventionally, the dn and dc values are determined by using a comparison method, and the disclosure uses a calculating formula as follows:

$$dc\overline{an} \text{ at the point } B = 5875.69\ K_D^2 \times K_\alpha^2 \times P \times dn^2/dc^3.$$

4. Creation of Grinding, Grading and Capacity Chain of Ores

The second-stage ore grinding and grading load controls the first-stage grinding, grading and capacity Q of ores; the second-stage ore grinding and grading load is controlled indirectly by the fineness content ratio $\theta_0$ in the settled ores of the second-stage Φ500 mm hydrocyclone, and the fineness content ratio $0_0$ is controlled indirectly by the centrifugal force strength $d\overline{can}$ value at the point B of the separation cone of the Φ500 mm hydrocyclone.

The capacity chain of the disclosure: $d\overline{can}$ at the point B—the fineness content ratio $\theta_0$ in the settled ores-$Q_2$ (second-stage load)-Q (first-stage capacity). In a word, one ton of new capacity may be increased by reducing several tons of −200 mesh grade ores in the settled product. The convertible ratio for different ores is as follows:

4.1. The convertible ratio of medium-low grade collophanite is 1.512:1, which means, every 1.512 tons of −200 mesh grade ores in the settled product of medium-low grade collophanite is reduced, and one ton of new capacity of the medium-low grade collophanite is increased, the same as below.

4.2. The convertible ratio of copper oxide ores is 2.64:1;

4.3. The convertible ratio of bauxite is 2.45:1.

BRIEF DESCRIPTION OF DRAWINGS

FIG. 1B is a parameter diagram of the process in FIG. 1A.

FIG. 2B is a parameter diagram of the process in FIG. 2A.

FIG. 3B is a parameter diagram of the process in FIG. 3A.

FIG. 4B is a parameter diagram of the process in FIG. 4A.

FIG. 5B is a parameter diagram of the process in FIG. 5A.

FIG. 6B is a parameter diagram of the process in FIG. 6A.

FIG. 7B is a parameter diagram of the process in FIG. 7A.

FIG. 8B is a parameter diagram of the process in FIG. 8A.

FIG. 9B is a parameter diagram of the process in FIG. 9A.

Figure 1A:
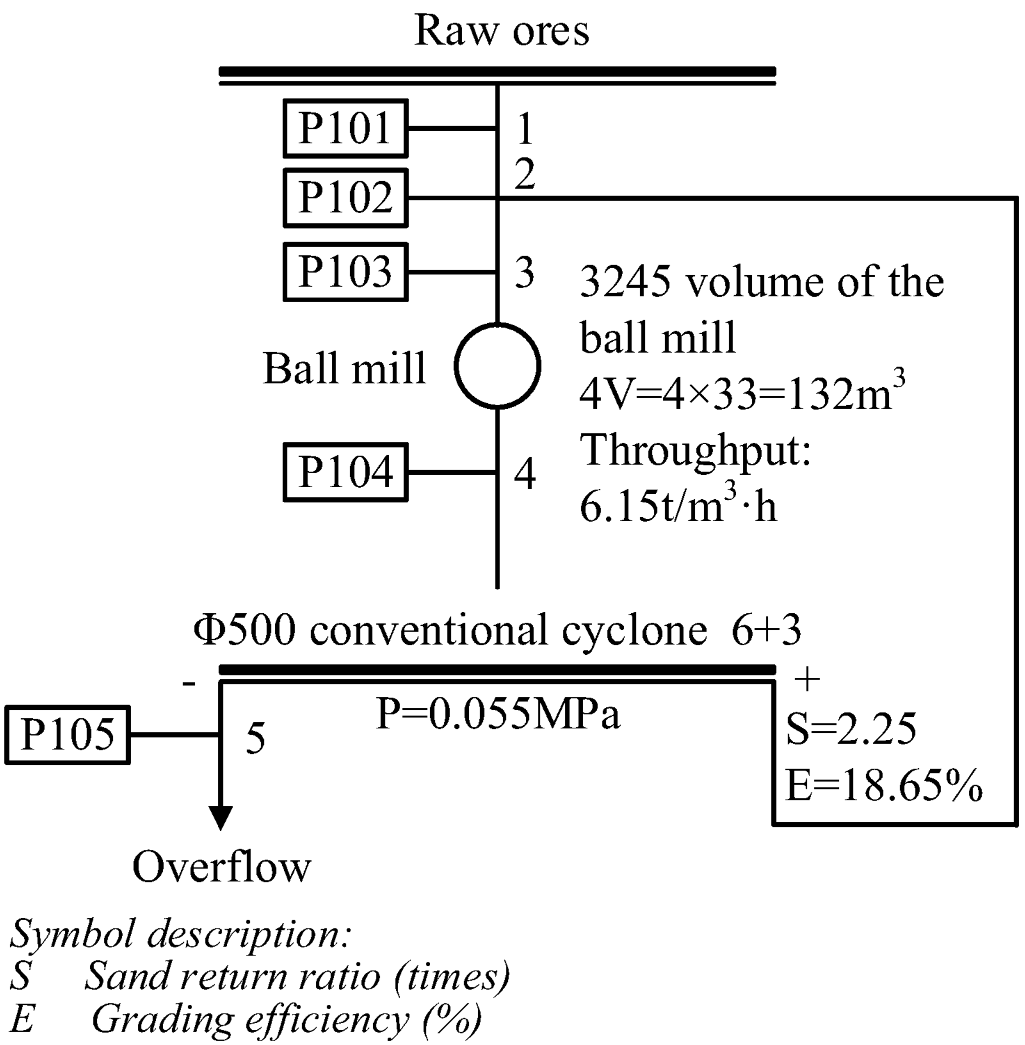
FIG. 1A (Prior art)
FIG. 1A is an ore grinding and grading process in the related art.
Figure 2A:
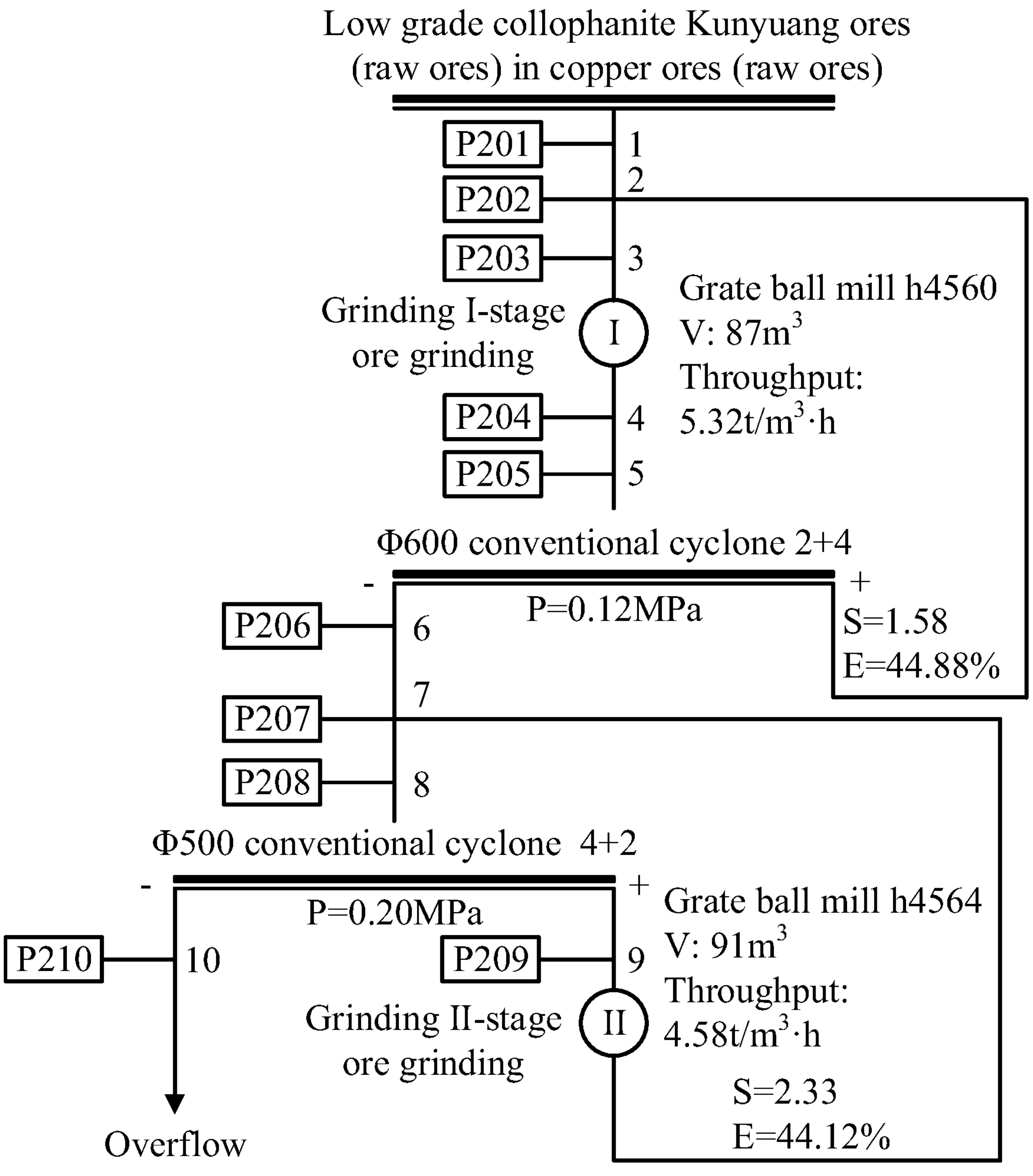
FIG. 2A is an ore grinding and grading process of Kunyang mine (conventional method).
Figure 3A:
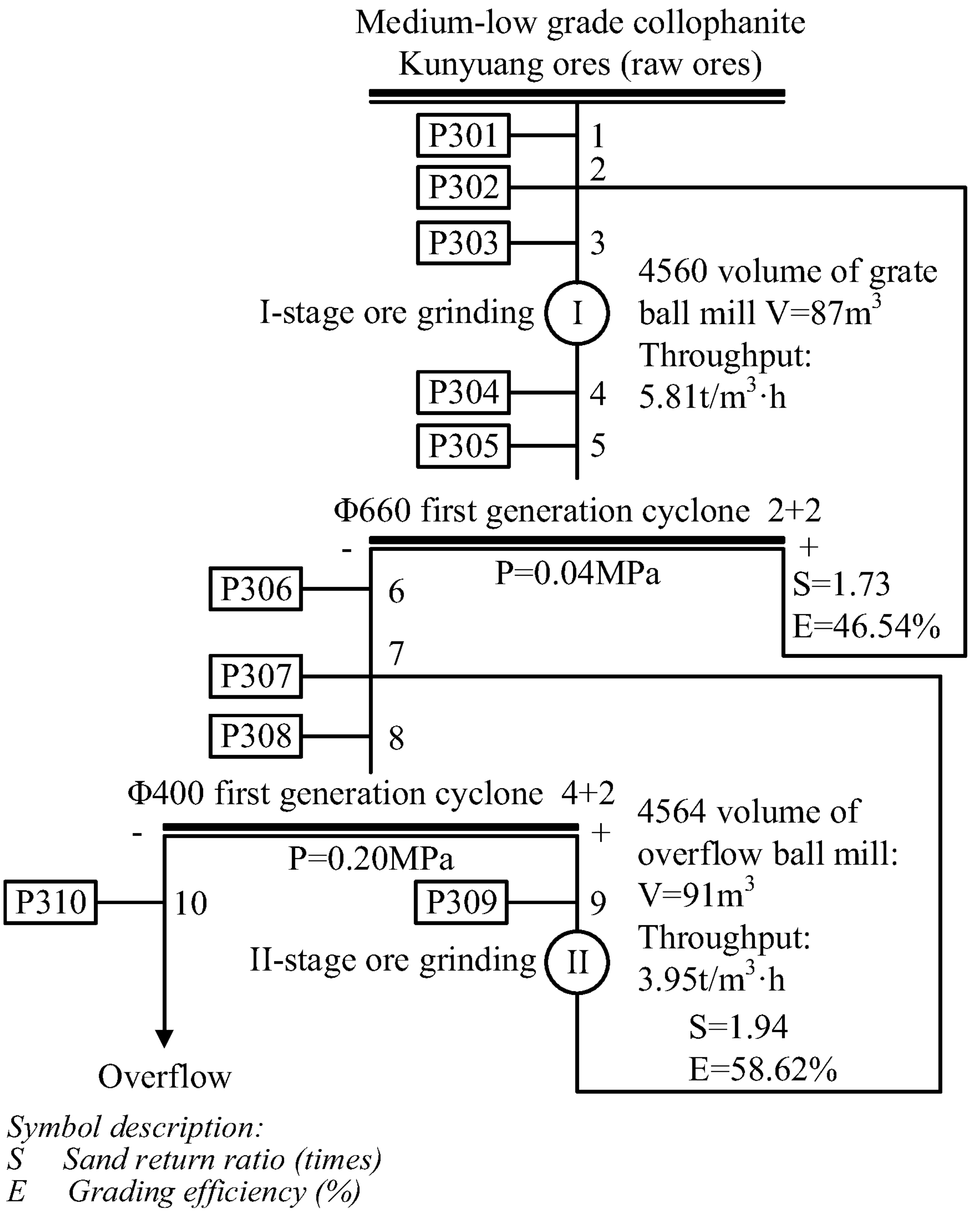
FIG. 3A is an ore grinding and grading process of Kunyang mine (First generation in the research and development center).
Figure 4A:
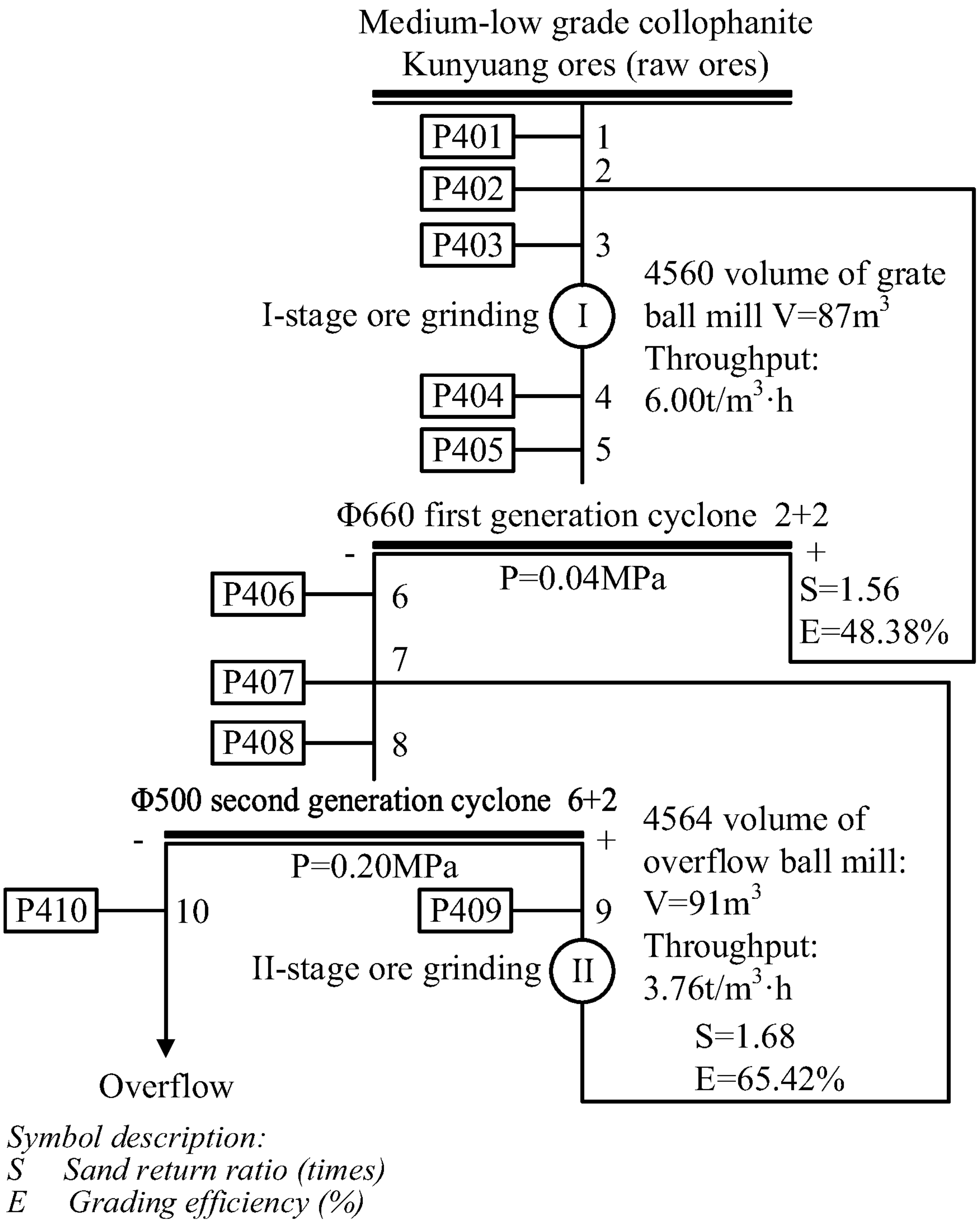
FIG. 4A is an ore grinding and grading process of Kunyang mine (Second generation in the research and development center).
Figure 5A:
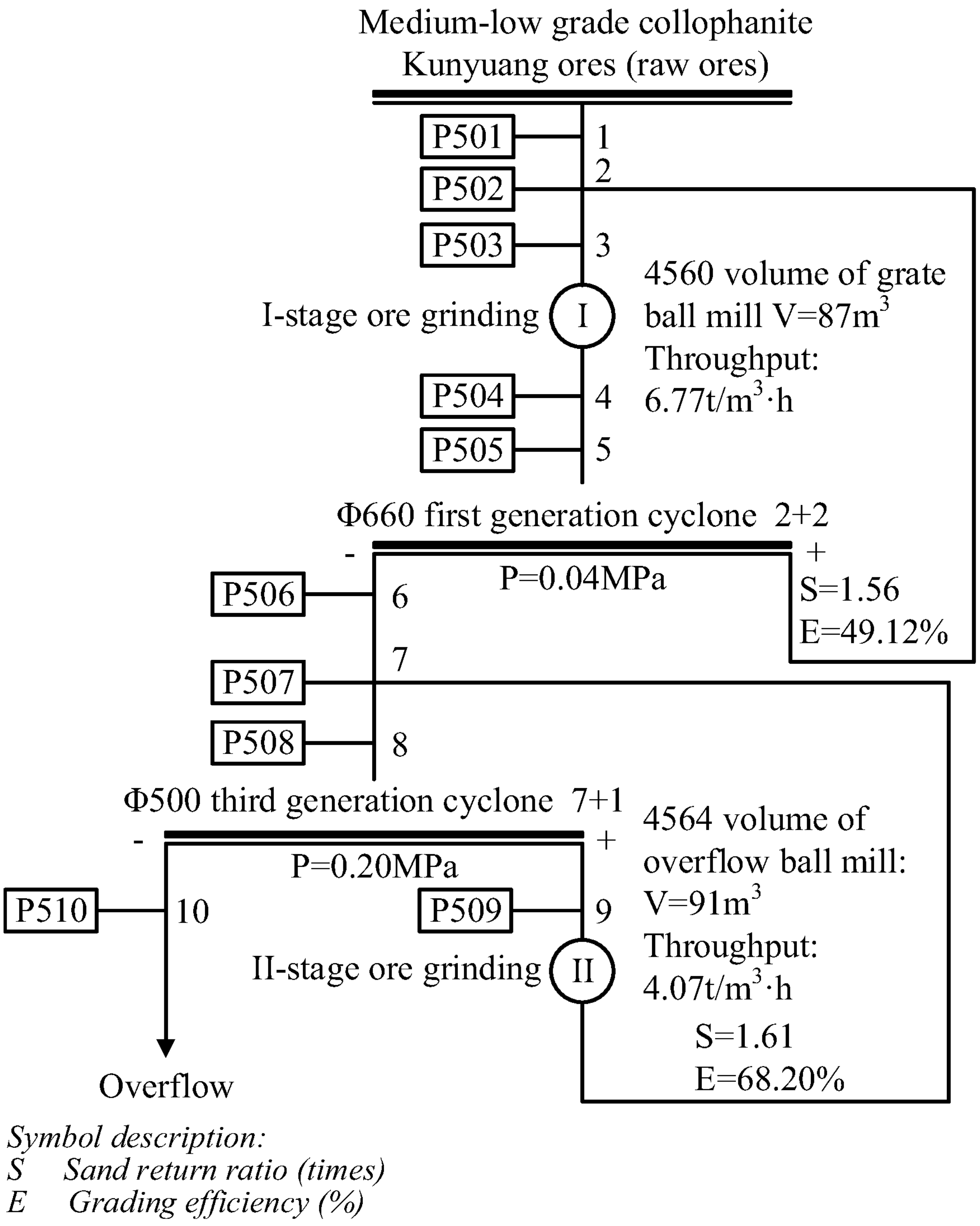
FIG. 5A is an ore grinding and grading process of Kunyang mine (Third generation in the research and development center, the disclosure).
Figure 6A:
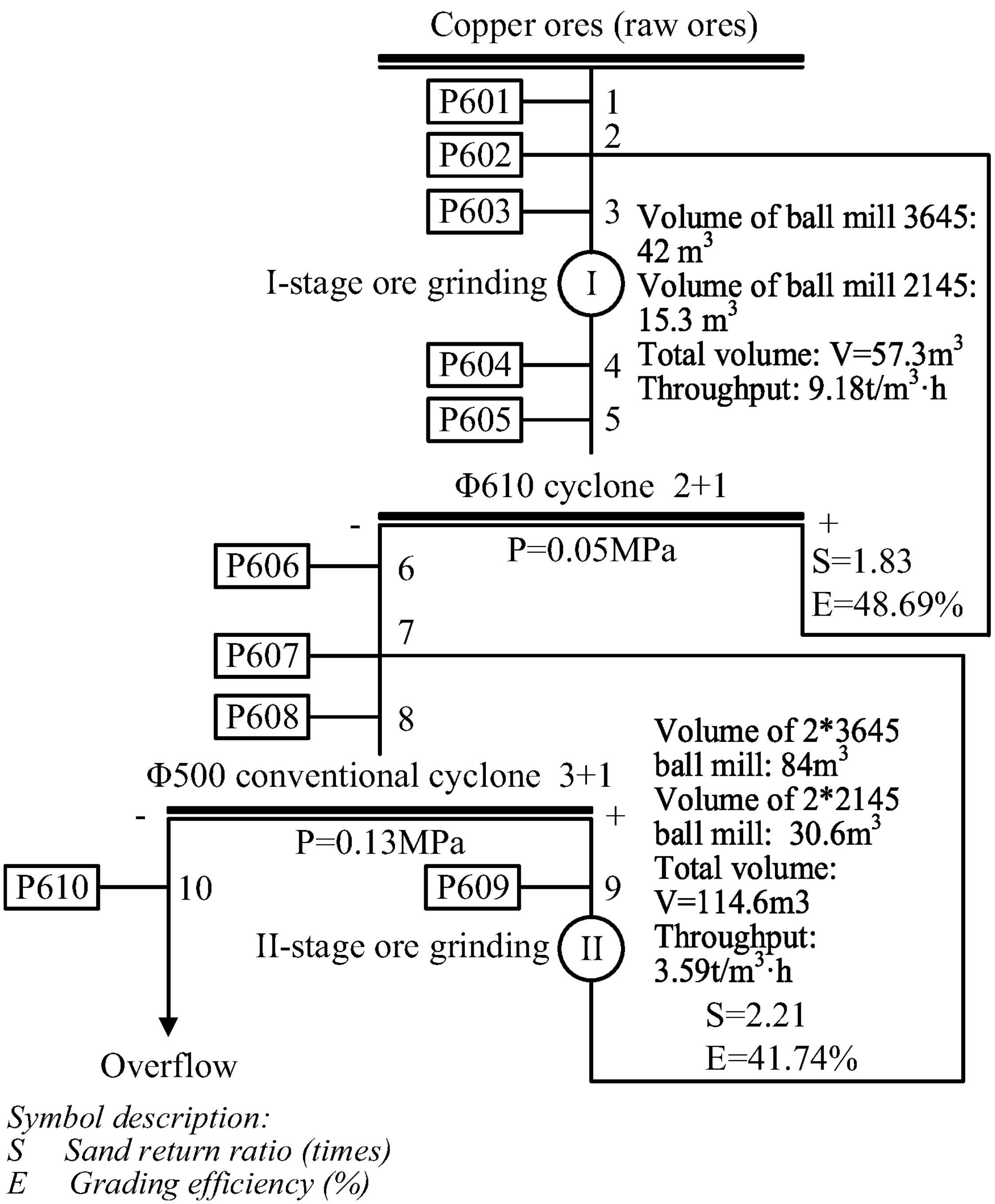
FIG. 6A is a conventional copper ore grinding and grading process in Dahongshan mine (Example 2).
Figure 7A:
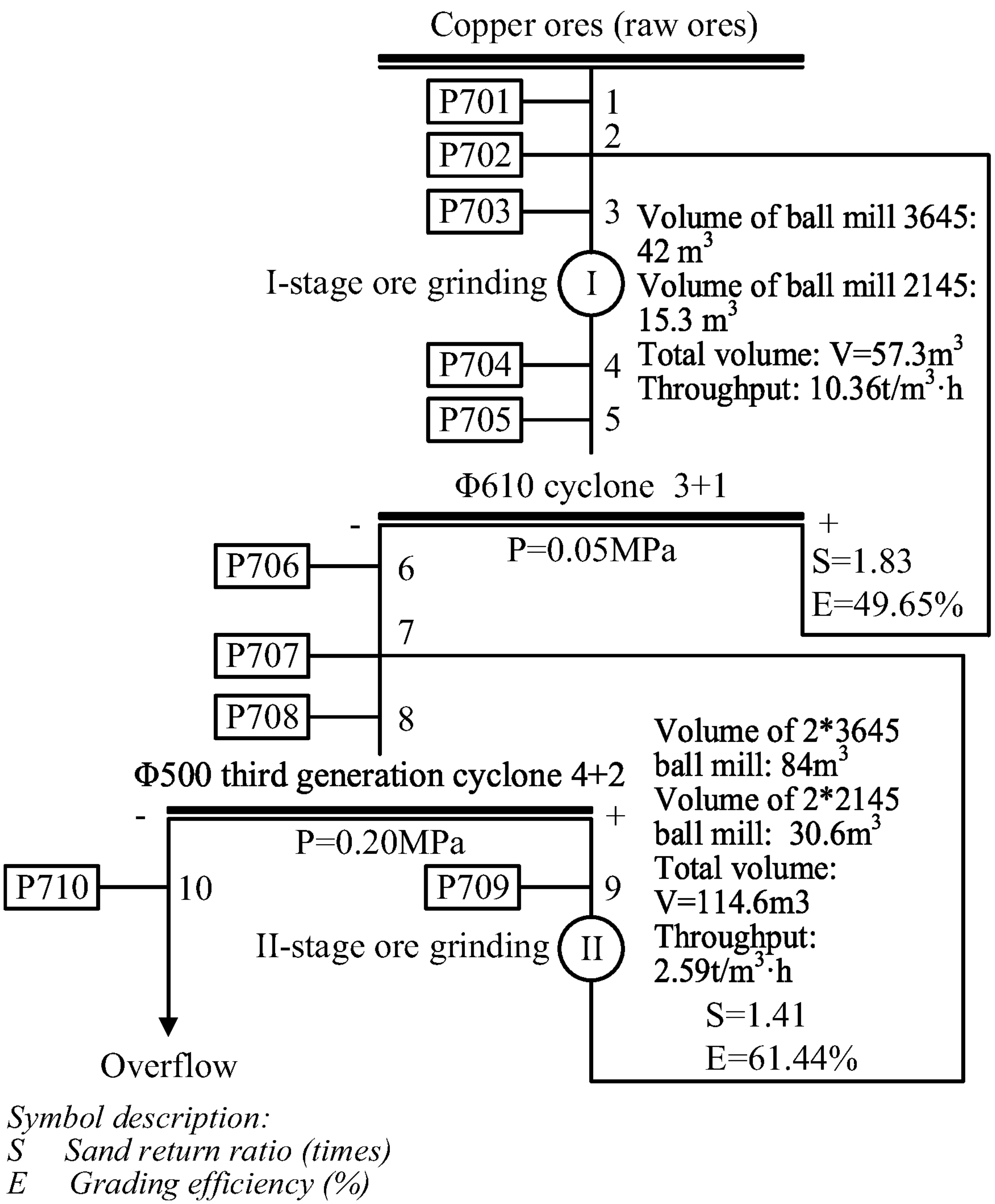
FIG. 7A is a third generation copper ore grinding and grading process in Dahongshan mine (Example 2).

In the drawings, the following reference numbers are used: 1. Outer overflow pipe; 2. Inner overflow pipe; 3. Pulp inflow body; 4. Cylinder; 5. Overflow column; 6. Air column; 7. Cone body; 8. Ore release nozzle; $h_1$. Generation and grading cone for settled ores and overflow; $h_2$. Separation cone for settled ores and overflow.

DETAILED DESCRIPTION

To further illustrate the disclosure, embodiments detailing a method of improving the grinding, grading and capacity of ores by reducing the fineness content ratio $\theta_0$ in the settled ores are described below. It should be noted that the following embodiments are intended to describe and not to limit the disclosure.

In addition, in the description below, the working schematic drawing of the cyclone is provided, while known structural parameters and descriptions are omitted.

Example 1 Medium-Low Grade Collophanite

1. The $D\overline{can}$ at the Point B is Gravitational Acceleration, as Shown in Table 3.

The $d\overline{can}$ values of the conventional Kunming Jiyuan Company-first generation-second generation-third generation (the disclosure, similarly hereinafter) are respectively 38.43-50.19-61.88-72.60 gravitational accelerations. The disclosure is 1.9 times of the conventional one, namely, 1.9=72.6/38.43. Under the action of the powerful separating centrifugal force strength on the separation cone, the settled ores and the overflow products are fully separated, and the fineness content ratio $\theta_0$ in the settled ores is reduced greatly.

2. Fineness Content Ratio $\theta_0$ Refers to Table 3.

The fineness content ratio $\theta_0$ of the conventional Kunming Jiyuan Company-first generation-second generation-third generation are respectively 47.57-34.54-26.86-23.74%. Compared with the conventional value, the fineness content ratio $0_0$ of the disclosure is decreased, namely, 2.0=47.57/23.74. The smaller the $\theta_0$ is, the smaller the −200 mesh grade ores in the settled ores is.

3. $Q_{-200\text{-}mesh}$ Ore Quantity t/h in the Settled Ores as Shown in FIG. 2A-FIG. 5B.

The ore quantities of the conventional Kunming Jiyuan Company-first generation-second generation-third generation are respectively 139.92-87.27-66.32-63.24% t/h. Compared with the conventional value, the Q-$200_{-mesh}$ ore quantity of the disclosure is decreased by 2.21 times, namely, 2.21=139.92/63.24. 76.68 tons of −200 mesh grade ores are decreased every hour, so that the load of the grinder is alleviated greatly, thereby providing a certain space for a newly added capacity.

4. Capacity Q, t/h, Refer to FIG. 2A to FIG. 5B.

The capacities of the conventional Kunming Jiyuan Company-first generation-second generation-third generation are respectively 179.30-185.39-203.67-230. Compared with the conventional capacity, the capacity of the disclosure is increased by 50.70 t/h.

5. Convertible Ratio

The convertible ratio is: (139.92−63.24)/(230.00−179.30)=1.512, namely, 1.512:1.1.512 tons of −200 mesh grade ores are reduced in the settled product, so that one ton of new capacity of the grinder is produced.

6. Concentration and Fineness of the Overflow Product, C %, β%, Refer to FIG. 2A to FIG. 5B.

The concentration and the fineness of the conventional Kunming Jiyuan Company-first generation-second generation-third generation are respectively 25.89, 86.00-25.05, 89.22-28.82, 88.66-28.90, 88.30. The overflow concentration C % is improved by 3.01% compared with the conventional one, namely, 3.01=28.90-25.89. The overflow fineness β% is improved by 2.3% compared with the conventional one, namely, 2.3=88.30−86.00. Increase of C % and β% verifies that the conventional technical design and research direction leaves much to be desired.

7. The Overflow Yield γ% in the Ore Grinding and Grading Circuit is Shown in Table 3.

The overflow yields of the conventional Kunming Jiyuan Company-first generation-second generation-third generation are respectively 30.07-34.04-37.29-38.32. The overflow yield is improved by 8.25% compared with the conventional one, namely, 8.25=38.32-30.07. Increase of they value and decrease of the fineness content ratio $0_0$ are completely same in effect to play a role of preventing a lot of −200 mesh grade ores from returning to the grinder to be ground again, so that the load of the grinder is alleviated and the capacity is improved.

8. Grading Efficiency E %, Refer to FIG. 2A to FIG. 5B.

The grading efficiencies E % of the conventional Kunming Jiyuan Company-first generation-second generation-third generation are respectively 44.12-58.62-65.42-68.20. The grading efficiency E % is improved by 24.08% compared with the conventional one, namely, 24.08=68.20−44.12.

The grading efficiency E % is defined as a ratio of the quantity T of −200 mesh grade ores in the overflow to the quantity $T_0$ of −200 mesh grade ores in the feeding ores, namely, $T/T_0$=E %.

$$T = (\alpha - \theta)100(\beta - \alpha) = (44.37 - 17.08)100(88.30 - 44.37) = 119884.97$$

$$T_0 = \alpha(\beta - \theta)(100 - \alpha) = 44.37(88.30 - 17.08)(100 - 44.37) = 175792.55$$

$$E = \frac{T}{T_0} = \frac{119884.97}{175792.55} = 68.20\%.$$

The θ value and the T value in the formula (α−θ) are in reverse proportion, and the value T increases while the θ value decreases.

The θ value in the formula (α−θ) may inhibit proper increase of the $T_0$ value to prevent the $T_0$ value from being too great.

The grading efficiency formula supports the nonobviousness of the disclosure theoretically.

9. Economic Benefit

The floating plant, Jinning beneficiation branch company, Yunnan Phosphate Group Co., Ltd. is designed by China Bluestar Lehigh Engineering Corporation according to a conventional method. The designed capacity of two series of Kunyang mines is 2×150=3000 thousand tons/year (raw ores), and the capacity of a single series is 208.33 t/h; for the Jinning mines, the capacity of one series is 1500 thousand tons/year (raw ores), and the capacity of a single series is 208.33 t/h, totally, 4500 thousand tons/year (raw ores).

The Kunyang mine series: after implemented in 2012 with the conventional method, the processing capacity per hour for the two series was 179.30 tons according to production data reports from 2014-2016, which was decreased by 29.03 t/h compared with the designed capacity 208.33 t/h, the total capacity was decreased to 2581.9 thousand tons/year (raw ores), and the decreasing extent was 418.1 thousand tons/year (raw ores). The electric consumption of the grinder was 27.28 kW·h/t (raw ores).

After implemented by technical transformation in the company since January 2017, the processing quantities per hour for the two series were both 230 tons, which was increased by 50.70 t/h compared with 179.30 t/h after the conventional method was implemented. The capacity was increased by 730.1 thousand tons/year, namely, 50.70×2×24×300=730.1 thousand tons/year. Based on a concentration yield 65%, 474.6 thousand tons/year was increased, and based on net margin per ton of 34.16 yuan, newly added profit was 16210700 yuan/year. The electric consumption of the grinder was decreased from 27.28 kW·h/t (raw ores) in the conventional method to 18.42 kW·h/t (raw ores), and the electric consumption was decreased by 8.86 kW·h/t (raw ores). Based on 0.45 yuan per kilowatt-hour, the electric charge per ton of raw ores was decreased by 3.987 yuan. The total capacity of the disclosure was increased to 1656.0 thousand tons/year, the electric charge was saved by 1656000×3.987=6602400 yuan, 18156800 yuan for 33 months. The total economic benefit of the Kunyang ore series was 16210700+6602400=22813100 yuan/year, 62736000 yuan for 33 months.

The Kunyang mine series: after implemented in 2012 in the conventional method, the processing capacity per hour for the single series was 189.00 tons according to production data reports from 2014-2016, which was decreased by 19.33 t/h compared with the designed capacity 208.33 t/h. The designed total capacity was decreased from 1500 thousand tons/year (raw ores) to 1360.8 thousand tons/year (raw ores), which was decreased by 139.2 thousand tons/year (raw ores). The electric consumption of the grinder was 25.25 kW·h/t (raw ores).

After implemented by technical transformation in the company since January, 2017, the processing capacity per hour for the single series was both 245 tons, which was increased by 56.00 t/h compared with 189.00 t/h after the conventional method was implemented. The total capacity was increased by 403.2 thousand tons/year, namely, 56.00×24×300=403.2 thousand tons/year. Based on a concentration yield 65%, 262.1 thousand tons/year of concentration was increased, and based on net margin per ton of concentration 34.16 yuan, newly added profit was 8952700 yuan/year. The electric consumption of the grinder was decreased from 25.25 kW·h/t (raw ores) in the conventional method to 17.74 kW·h/t (raw ores), and the electric consumption was decreased by 7.51 kW·h/t (raw ores). Based on 0.45 yuan per kilowatt-hour, the electric charge per ton of raw ores was decreased by 3.3795 yuan. The total capacity of the disclosure was increased to 1764.0 thousand tons/year, the electric charge was saved by 1764000×3.3795=5961400 yuan, 16394000 yuan for 33 months. The total economic benefit of the Kunyang ore series was 8952700+5961400=14914100 yuan/year, 41013800 yuan for 33 months.

Compared with the related art, the economic benefits of the totally three series: Kunyang mines, Jinning mines in Jinning beneficiation branch company are increased after the method of the disclosure is implemented:

1. Concentrate benefit is increased by 16210700+8952700=25163300 yuan/year;
2. Electricity is saved by 6602400+5961400=12563800 yuan/year;
3. The total annular benefit is 25163300+12563800=37727100 yuan/year;
4. The total economic benefit for 21 months is 69200000+34550500=103750500 yuan.

Example 2 Copper Ores

The grinding and grading process of copper ore of Yunnan Dahongshan mine is as same as that in Example 1.

1. The Dc$\overline{an}$ Value at the Point B is Gravitational Acceleration, as Shown in Table 4:

TABLE 4

Centrifugal force field of generation and separation of settled ores and overflow of hydrocyclone

| Name | Symbol | Unit | Bauxite: Φ500 mm Conventional hydrocyclone | Bauxite: Φ466 mm Fourth generation of R & D Center | Copper ore: Φ500 mm Conventional hydrocyclone | Copper ore: Φ500 mm Third generation of R & D Center |
|---|---|---|---|---|---|---|
| Centrifugal force field of generation of settled ores and overflow at point A | | | | | | |
| Ore feeding pressure | P | MPa | 0.10 | 0.20 | 0.13 | 0.20 |
| Volume flow | dnV | $m^3/h$ | 280.01 | 137.87 | 239.83 | 133.83 |
| Tangential speed | dnu | m/s | 3.87 | 5.32 | 4.65 | 5.35 |
| Rotation speed | dnn | rpm | 1411.06 | 2083.67 | 1697.64 | 1952.72 |
| Centrifugal force strength | dn$\overline{an}$ | g | 6.10 | 12.40 | 8.83 | 11.69 |
| Centrifugal force field of separation of settled ores and overflow at point B | | | | | | |
| Separation speed | dcu | m/s | 4.89 | 6.69 | 4.99 | 6.26 |
| Rotation speed | dcn | rpm | 4955.17 | 11295.02 | 5510.01 | 10377.01 |
| Centrifugal force strength | dc$\overline{an}$ | Gravitational acceleration | 27.09 | 84.45 | 30.70 | 72.60 |
| Separation granularity | $d_{97}$ | μm | 86.07 | 56.29 | 72.24 | 57.44 |
| Primary parameters | | | | | | |
| Effective volume | $V_1$ | $m^3$ | 0.252 | 0.205 | 0.252 | 0.208 |
| Working time | t | s | 3.24 | 5.36 | 3.78 | 5.60 |
| Equivalent diameter of slurry feeding pipe | dnΦ | Φmm | 160 | 95.70 | 135 | 94 |
| Overflow pipe diameter | dcΦ | Φmm | 180 | 108 | 165 | 110 |
| Diameter of ore release nozzle | $d_H$Φ | Φmm | 80 | 69 | 78 | 70 |
| Processing capacity | Q | t/h | 85.93 | 115.00 | 186.00 | 210.00 |
| Fineness content ratio | $\theta_0$ | % | 58.70 | 16.52 | 44.76 | 23.74 |
| Overflow rate of grinding circuit | | % | 12.40 | 29.74 | 31.16 | 41.49 |

The dc values of the conventional Haiwang Company and the disclosure (third generation, similarly hereinafter) are respectively 30.7 and 72.6 gravitational acceleration. The method of the disclosure is 2.36 times of the conventional one. Under the action of the powerful separating centrifugal force strength on the separation cone, the settled ores and the overflow products are fully separated, and the fineness content ratio $\theta_0$ in the settled ores is reduced greatly.

2. Fineness Content Ratio $\theta_0$, as Shown in Table 4.

The fineness content ratios $0_0$ of the conventional Haiwang Company and the disclosure are respectively 44.76% and 23.74%. Compared with the conventional value, the fineness content ratio $0_0$ of the disclosure is decreased by 1.89 times. The smaller the $\theta_0$ is, the smaller the ore quantity of −200 mesh in the settled ores is.

3. Q-$200_{-mesh}$ Ore Quantity t/h in the Settled Ores, as Shown in FIG. 6A-FIG. 7B.

The Q-$200_{-mesh}$ ore quantities of the conventional Haiwang Company and the disclosure are respectively 113.01 and 49.59 t/h. Compared with the conventional ore quantity, the ore quantity of the disclosure is decreased by 2.28 times. 63.42 tons of −200 mesh grade ores are decreased every hour, so that the load of the grinder is alleviated greatly, thereby providing a certain space for a newly added capacity.

4. Capacity Q, t/h, as Shown in FIG. 2A to FIG. 5B.

The capacities of the conventional Haiwang Company and the disclosure are respectively 186 and 210. Compared with the conventional capacity, the capacity of the disclosure is increased by 24 t/h.

5. Convertible Ratio

The convertible ratio is: (113.01−49.59)/(210−186)=2.64, namely, 2.64:1.2.64 tons of the −200 mesh grade ores are reduced in the settled product, and one ton of capacity of the grinder is obtained.

6. Concentration and Fineness of the Overflow Product, C %, β%, as Shown in FIG. 6A-FIG. 7B.

The concentrations of the conventional Haiwang Company and the disclosure are respectively 40.0 and 41. The fineness of the conventional Haiwang Company and the fineness of the disclosure are respectively 75 and 78.5. The overflow concentration C % is improved by 1% compared with the conventional one. The overflow fineness β% is improved by 3.5% compared with the conventional one.

7. The Overflow Yield γ% in the Ore Grinding and Grading Circuit, as Shown in Table 4.

The overflow yields of the conventional Haiwang Company and the disclosure are respectively 31.16 and 41.49. The overflow yield is improved by 10.33% compared with the conventional one, namely, 10.33=41.49-31.16. Increase of they value and decrease of the fineness content ratio $0_0$ are completely same in effect to play a role of preventing a lot of −200 mesh grade ores from returning to the grinder to be ground again, so that the load of the grinder is alleviated and the capacity is improved.

8. Efficiency E %, Refer to FIG. 6A to FIG. 7B.

The efficiencies E % of the conventional Haiwang Company and the disclosure are respectively 41.74 and 61.44. The efficiency E % is improved by 19.7% compared with the conventional one. This owes to the increase of 3.5% of the overflow fineness and decrease of 21.02% of the fineness content ratio $\theta_0$ in the settled ores, which leads to a final result that the ore quantity of −200 mesh grade ores in the overflow product is increased greatly.

Example 3 Bauxite

The aluminum oxide plant of Guangxi branch company of Aluminum Corporation of China Limited employs a two-stage ore grinding process with a first-stage open circuit.

1. The Dc$\overline{an}$ Value at the Point B is Gravitational Acceleration, as Shown in Table 4.

The dc values of the conventional Weidongshan Company and the disclosure (third generation, similarly hereinafter) are respectively 27.09 and 84.45 gravitational accelerations. The disclosure is 3.13 times of the conventional one. Under the action of the powerful separating centrifugal force strength on the separation cone, the settled ores and the overflow products are fully separated, and the fineness content ratio $\theta_0$ in the settled ores is reduced greatly.

2. Fineness Content Ratio $0_0$, Refer to Table 4.

The fineness content ratios $0_0$ of the conventional Weidongshan Company and the disclosure are respectively 58.70% and 16.52%. Compared with the conventional value, the fineness content ratio $0_0$ of the disclosure is decreased by 3.55 times. The smaller the $\theta_0$ is, the smaller the −200 mesh grade ores in the settled ores is.

3. Q-200$_{-mesh}$ Ore Quantity t/h in the Settled Ores, as Shown in FIG. 8A-FIG. 9B.

The Q-200$_{-mesh}$ ore quantities of the conventional Haiwang Company and the disclosure are respectively 89.53 and 18.20 t/h. Compared with the conventional value, the ore quantity of the disclosure is decreased by 4.92 times. 71.33 tons of −200 mesh grade ores are decreased every hour, so that the load of the grinder is alleviated greatly, thereby providing a certain space for increasing the capacity.

Figure 8A:
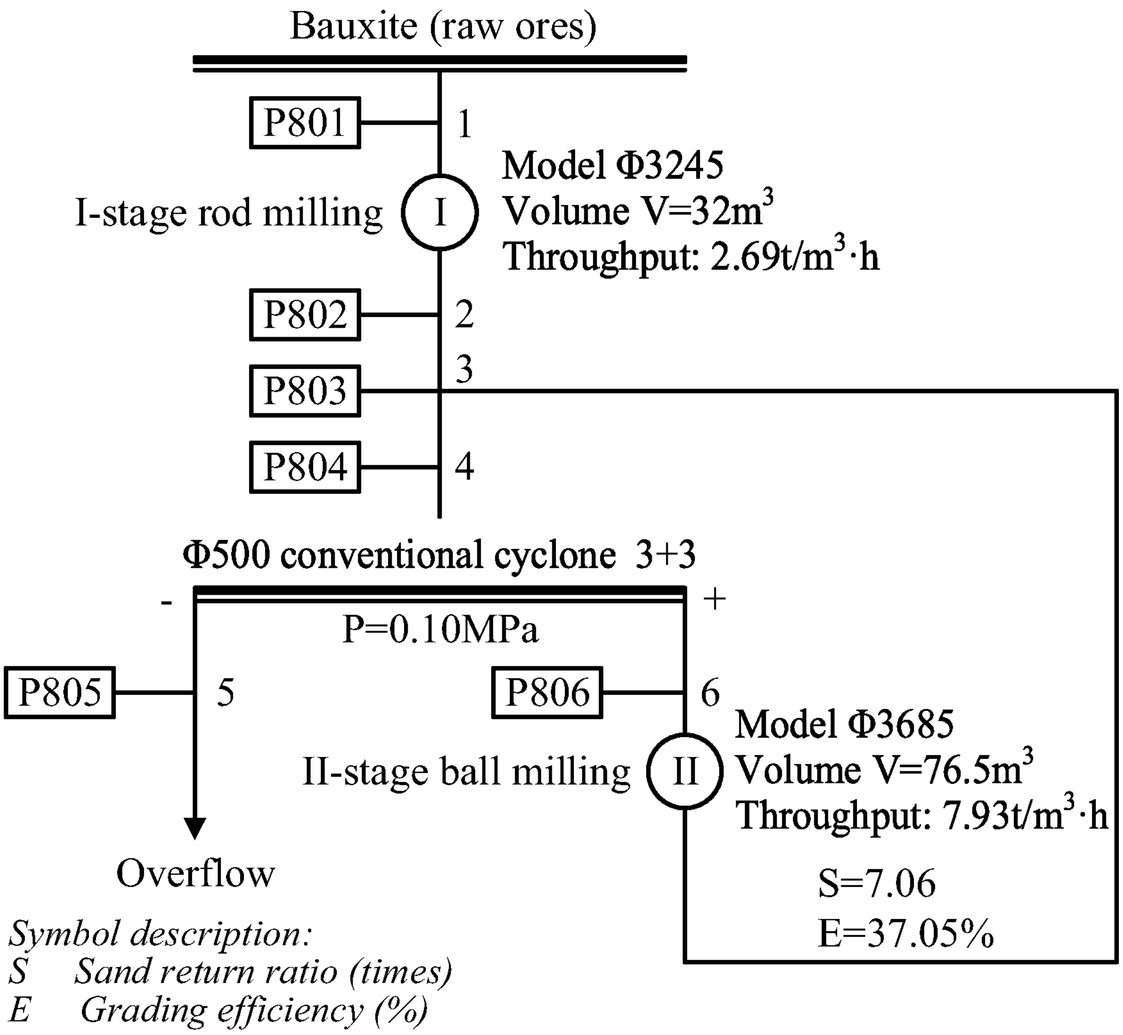
FIG. 8A is a conventional two-stage one-closed-circuit ore grinding and grading process flow of Guangxi Pingguo bauxite plant (Example 3).
Figure 9A:
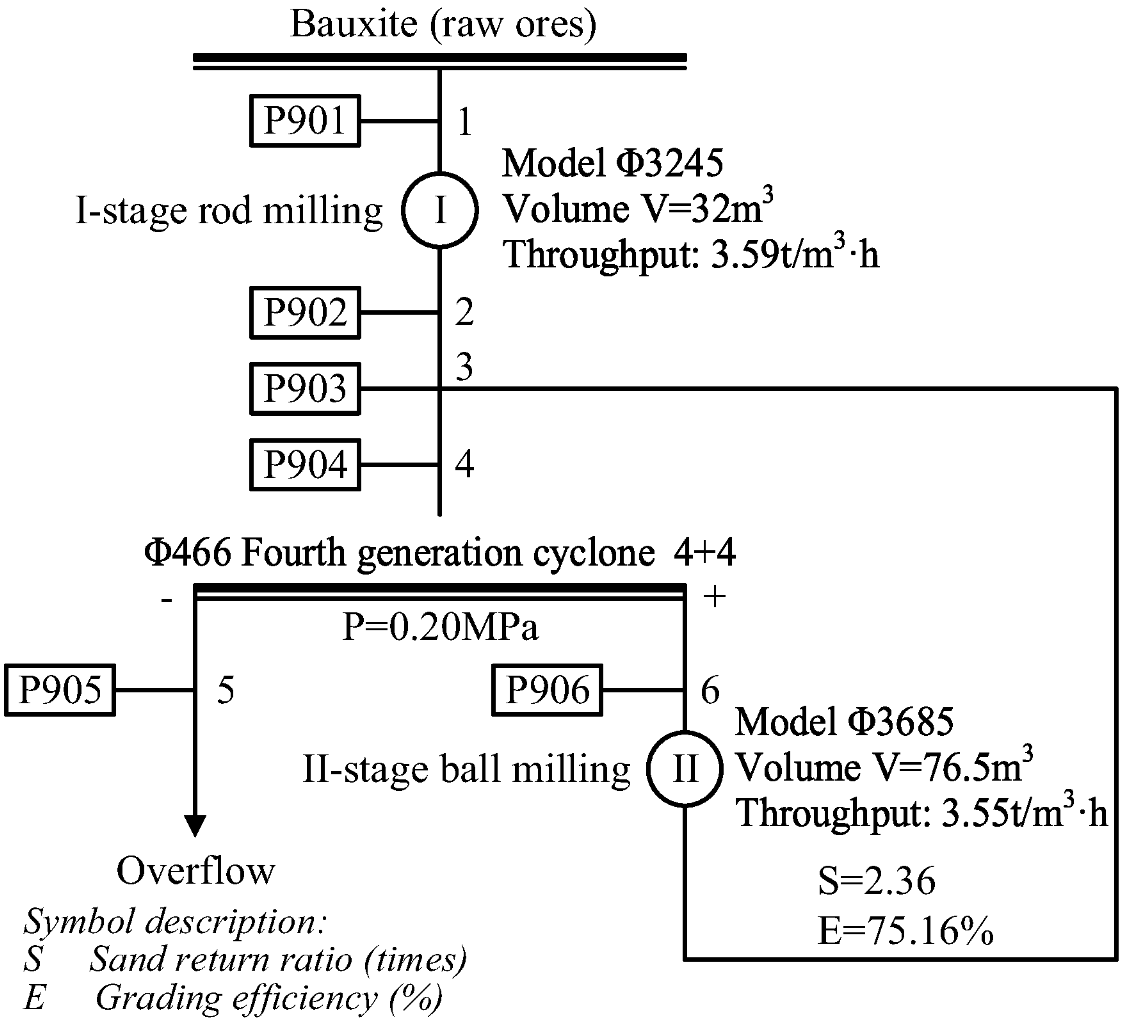
FIG. 9A is a fourth generation two-stage one-closed-circuit ore grinding and grading process flow of Guangxi Pingguo bauxite plant (Example 3).
Figure 10:
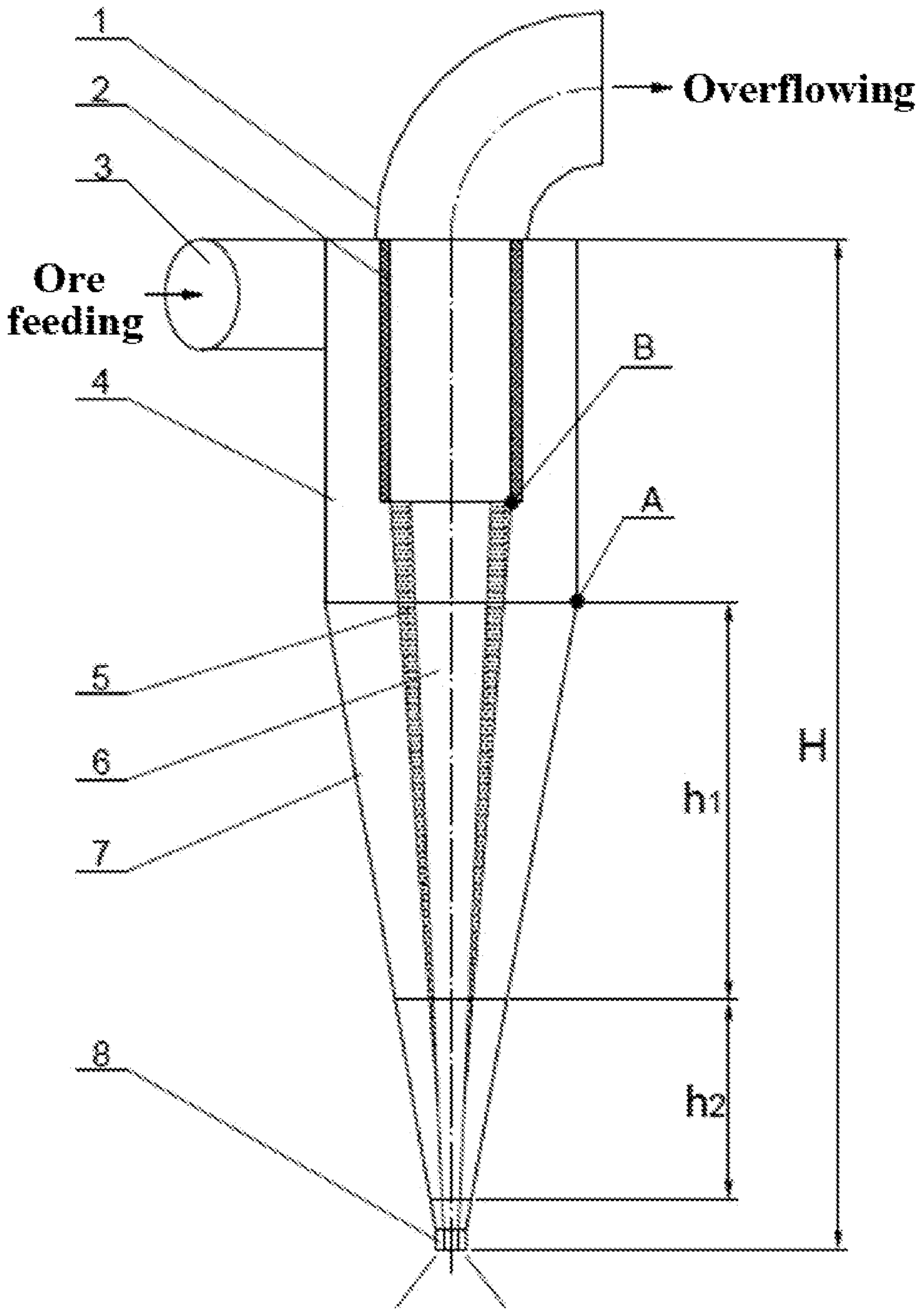
FIG. 10 is a schematic diagram of a cyclone of the disclosure.

4. Capacity Q, t/h, as Shown in FIG. 8A and FIG. 9B.

The fineness content ratios $0_0$ of the conventional Weidongshan Company and the disclosure are respectively 85.93 and 115. Compared with the conventional capacity, the capacity of the disclosure is increased by 29.07 t/h.

5. Convertible Ratio

The convertible ratio is: (89.53−18.20)/(115−85.93) =2.45, namely, 2.45:1.2.45 tons of −200 mesh grade ores are reduced in the settled ores, so that one ton of capacity of the grinder is produced.

6. Concentration and Fineness of the Overflow Product, C %, β%, as Shown in FIG. 8A and FIG. 9B.

The concentrations of the conventional Weidongshan Company and the disclosure are respectively 20.98 and 21.59. The fineness of the conventional Weidongshan Company and the fineness of the disclosure are respectively 73.29 and 80. The overflow concentration C % is improved by 0.61% compared with the conventional one. The overflow fineness β% is improved by 6.71% compared with the conventional one.

7. The Overflow Yield γ% in the Ore Grinding and Grading Circuit Refers to Table 4.

The overflow yields of the conventional Weidongshan Company and the disclosure are respectively 12.40 and 29.74. The overflow yield is improved by 2.4% compared with the conventional one. Increase of they value and decrease of the fineness content ratio $0_0$ are completely same in effect to play a role of preventing a lot of −200 mesh grade ores from returning to the grinder to be ground again, so that the load of the grinder is alleviated and the capacity is improved.

8. Efficiency E %, Refers to FIG. 8A and FIG. 9B.

The efficiencies E % of the conventional Weidongshan Company and the disclosure are respectively 37.05 and 75.16. The Efficiency E % is improved by 2.03% compared with the conventional one. This owes to increase of 6.71% of the overflow fineness and decrease of 42.18% of the fineness content ratio $\theta_0$ in the settled ores, which leads to a final result that the ore quantity of −200 mesh grade ores in the overflow product is increased greatly.

The invention claimed is:

1. A method of improving grinding, grading and capacity of ores, the method comprising:

providing a two-stage ore grinding and grading system comprising a first fully closed circuit comprising a grinder and a hydrocyclone, wherein:

the hydrocyclone comprises a feeding pipe, a cylinder, a cone body, a release nozzle, and an overflow pipe; the cone body comprises a grading section and a separation section;

the feeding pipe is connected to the cylinder;

the feeding pipe is adapted to introduce feeding ores into the cylinder for rotation;

the grading section of the cone body is connected to the cylinder, and the separation section of the cone body is connected to the release nozzle;

the overflow pipe is disposed within the cylinder;

the hydrocyclone is adapted to rotate the feeding ores to create an overflow and underflow ores;

the release nozzle is adapted to discharge the underflow ores out of the hydrocyclone to the grinder; and the overflow pipe is adapted to discharge the overflow out of the hydrocyclone; and controlling parameters for ore grinding and grading as follows: controlling a centrifugal force strength dc$\overline{an}$ value of a point B; in the separation section;

controlling a fineness content ratio $\theta_0$ in the underflow ores; controlling a second-stage ore grinding and grading load $Q_2$; and acquiring a first-stage grinding, grading and capacity Q of ores.

2. The method of claim 1, wherein in the grading section, a centrifugal force strength dn$\overline{an}$ at a point A is 12-13 gravitational accelerations; in the separation section, a centrifugal force strength dc$\overline{an}$ at a at the point B is 72.6-84.45 gravitational accelerations; and the centrifugal force strength dc$\overline{an}$ at the point B of the separation section is 6.05-6.50 times of $\overline{an}$ an at the point A of the grading section.

3. The method of claim 1, wherein the fineness content ratio $\theta_0$ in the underflow ores in the hydrocyclone is 23.74-16.52%.

4. The method of claim 2, wherein the fineness content ratio $\theta_0$ in the underflow ores in the hydrocyclone is 23.74-16.52%.

5. The method of claim 1, wherein reducing the fineness content ratio $\theta_0$ in the underflow ores in the hydrocyclone decreases tons of −200 mesh grade ores in the underflow ores, and one ton of new capacity is increased, with a convertible ratio as follows:

1) A convertible ratio of medium-low grade collophanite is 1.512:1, which means, every 1.512 tons of −200 mesh grade ores in the underflow ores of the medium-low grade collophanite is reduced, and one ton of new capacity of the medium-low grade collophanite is increased;

2) A convertible ratio of copper oxide ores is 2.64:1, which means, every 2.64 tons of −200 mesh grade ores in the underflow ores of the copper oxide ores is reduced, and one ton of new capacity of the copper oxide ores is increased; and 3) A convertible ratio of bauxite is 2.45:1, which means, every 2.45 tons of −200 mesh grade ores in the underflow ores of the bauxite is reduced, and one ton of new capacity of the bauxite is increased.

6. The method of claim 1, wherein the centrifugal force strength dc$\overline{an}$ at the point B of the separation section of the hydrocyclone is calculated as follows: the centrifugal force strength dc$\overline{an}$ at the point B=5875.69 $K_D^2 \times K_a^2 \times P \times dn^2/dc^3$;

$K_D$ is a diameter correction coefficient of the hydrocyclone;

$K_a$ is a core angle correction coefficient of the hydrocyclone;

dn is an equivalent diameter of the feeding pipe, cm;

dc is a diameter of the overflow pipe, cm;

P is an ore feeding pressure, MPa; and 5875.69 is a constant value.

7. The method of claim 1, wherein a concentration and a fineness of the overflow in the hydrocyclone are increased respectively, as follows:

1) 3.01% and 2.3% for medium-low grade collophanite;

2) 1% and 3.5% for copper oxide ores; and 3) 0.61% and 6.71% for bauxite.

8. The method of claim 1, wherein a cylindrical diameter D of the hydrocyclone is Φ466-Φ500 mm.

* * * * *